United States Patent
Parihar et al.

(10) Patent No.: US 12,260,242 B2
(45) Date of Patent: Mar. 25, 2025

(54) MANAGING VIRTUAL INFRASTRUCTURE RESOURCES IN CLOUD ENVIRONMENTS

(71) Applicant: VMware LLC, Palo Alto, CA (US)

(72) Inventors: Shruti Parihar, Los Altos, CA (US);
Mark Whipple, Golden, CO (US);
Sachin Thakkar, San Jose, CA (US);
Akshatha Sathyanarayan, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 219 days.

(21) Appl. No.: 17/559,126

(22) Filed: Dec. 22, 2021

(65) Prior Publication Data

US 2022/0121469 A1 Apr. 21, 2022

Related U.S. Application Data

(63) Continuation of application No. 16/428,084, filed on May 31, 2019, now Pat. No. 11,237,861.

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45595* (2013.01)

(58) Field of Classification Search
CPC .............. G06F 9/45558; G06F 9/5077; G06F 2009/4557; G06F 2009/45595
See application file for complete search history.

(56) References Cited

U.S. PATENT DOCUMENTS

| | | | |
|---|---|---|---|
| 10,412,122 B1 * | 9/2019 | Olofsson | H04L 61/2514 |
| 11,483,405 B2 * | 10/2022 | Le | H04L 67/34 |
| 2009/0316910 A1 * | 12/2009 | Maeda | H04L 9/0891 380/279 |
| 2012/0317648 A1 | 12/2012 | Brown | |
| 2013/0258839 A1 * | 10/2013 | Wang | H04L 45/58 370/221 |

(Continued)

OTHER PUBLICATIONS

Gunleifsen et al. A Tiered Control Plane Model for Service Function Chaining Isolation. [online]. Future Internet., pp. 1-33. Retrieved From the Internet <https://www.mdpi.com/1999-5903/10/6/46> (Year: 2018).*

*Primary Examiner* — April Y Blair
*Assistant Examiner* — Jonathan R Labud
(74) *Attorney, Agent, or Firm* — King Intellectual Asset Management (57) ABSTRACT

Examples for managing virtual infrastructure resources in cloud environments can include (1) instantiating an orchestration node for managing local control planes at multiple clouds, (2) instantiating first and second local control planes at different respective clouds, the first and second local control planes interfacing with different respective virtualized infrastructure managers ("VIMs"), where the first and second local control planes establish secure communication with the orchestration node, and (3) deploying, by the orchestration node, services to the first and second local control planes. Further, the first and second local control planes can cause the respective VIMs to manage the services at the different respective clouds.

20 Claims, 7 Drawing Sheets

(56) References Cited

U.S. PATENT DOCUMENTS

| | | | |
|---|---|---|---|
| 2015/0066560 A1* | 3/2015 | Madani | H04L 41/5041 |
| | | | 705/7.23 |
| 2015/0117408 A1 | 4/2015 | Kedalagudde | |
| 2016/0285832 A1* | 9/2016 | Petrov | H04L 67/60 |
| 2016/0381116 A1* | 12/2016 | Hui | H04L 69/02 |
| | | | 455/425 |
| 2017/0153885 A1 | 6/2017 | Regan | |
| 2017/0187785 A1 | 6/2017 | Johnson | |
| 2018/0270219 A1 | 9/2018 | Li | |
| 2018/0309662 A1 | 10/2018 | Clarke | |
| 2020/0028880 A1* | 1/2020 | Sood | H04Q 9/00 |
| 2020/0151023 A1 | 5/2020 | Bai | |
| 2021/0144517 A1* | 5/2021 | Guim Bernat | H04L 9/3247 |

\* cited by examiner

MANAGING VIRTUAL INFRASTRUCTURE RESOURCES IN CLOUD ENVIRONMENTS

This application claims priority as a continuation of U.S. patent application Ser. No. 16/428,084, filed May 31, 2019, and entitled "MANAGING VIRTUAL INFRASTRUCTURE RESOURCES IN CLOUD ENVIRONMENTS," which is herein incorporated in its entirety by reference for all purposes.

BACKGROUND

Network Function Virtualization ("NFV") provides a way to virtualize and distribute network functions across a virtual layer of a Telco network. Virtual network functions ("VNFs") can be created to perform a wide variety of network functions at cloud locations across the Telco network. VNFs can be connected to one another to create multi-part VNFs. VNFs can offer content service providers ("CSPs") with opportunities to deploy complex network functions and services in distributed network models and architectures. Different VNFs can perform different network functions in the virtual layer of a network. In a slice-based network, each slice can implement one or more VNFs to handle the specific functionality of that slice.

Network function virtualization orchestrators ("NFVOs") can use virtualized infrastructure managers ("VIMs") to implement and manage the VNFs. However, current orchestration methods do not allow for efficient distribution of VIM management. For example, a single manager node can be overburdened by the number of VNFs that may be implemented over various clouds and nodes in the Telco network. Currently, VNF management cannot be easily distributed such that VNFs are locally managed at different clouds while also enforcing an overall cross-cloud management scheme. Although VNFs can be moved through the network and across clouds, management of these VNFs has been less dynamic and flexible, leading to inefficiencies in multi-cloud resource provisioning and management of the resources.

As a result, a need exists for improved orchestration systems and methods for managing infrastructure resources on virtualized and physical networks.

SUMMARY

Examples described herein include systems and methods for managing virtual infrastructure resources in cloud environments. One example of a virtual infrastructure can include the infrastructure that supports virtual machines ("VMs") and that can have virtualization and management software layers. The virtualization infrastructure can include capabilities that aggregate and present host hardware to VMs as a set of resources. In one example, a method can include instantiating an orchestration node for managing local control planes at multiple clouds. In some examples, orchestration can include the automated configuration, coordination, and management of computer systems and software. Orchestration can be used in the context of service-oriented architecture, virtualization, provisioning, converged infrastructure and dynamic datacenters. Orchestration can serve to align business requests with the applications, data, and infrastructure.

The method can further include instantiating first and second local control planes at different respective clouds, the first and second local control planes interfacing with different respective VIMs. Different VIMs can be established for different tenants of the network provider, in an example. The first and second local control planes can also establish secure communication with the orchestration node. Further, the method can include deploying, by the orchestration node, services to the first and second local control planes, where the first and second local control planes cause the respective VIMs to manage the services at the different respective clouds. Non-limiting examples of such services can include resource provisioning, firewalls, domain name system services, caching or network address translation services, and the like. In some examples, the VIM can include a NFV implementation that can manage the hardware and software resources that a service provider uses to create service chains and deliver network services to users. Among other functions, the VIM can manage the allocation, upgrade, release, and reclamation of NFV infrastructure resources and optimize their use. In some aspects, a VIM can refer to the full stack for a virtualized network, that is, the set of software subsystems needed to create a complete platform such that no additional software is needed to support applications. The VIM can be in communication with a cloud management plane, which can be at a higher level on the network.

In some examples, an entitlement server can authorize the orchestration node to deploy the services. Moreover, the method can include receiving, by the orchestration node, a resource request from the first local control plane. The orchestration node can check with the entitlement server to determine if the resource is allowed at the VIM associated with the first control plane. If so, the orchestrator can cause deployment of resources from an additional local control plane of the local control planes to the first local control plane. The resources can include a compute, storage, or networking resource. The resources can be, for example, virtual machines.

The entitlement server can authorize different services for a second orchestration node, where the second orchestration node deploys the different services to a third local control plane. The deployment of the services to the first local control plane can include receiving, at the orchestration node, an activation key from the first local control plane. Further, the authorization by the entitlement server includes verifying the activation key. The authorization may be performed using any suitable technique (for example, database lookup, encryption techniques, and the like), and may be performed in accordance with a network policy.

The local control planes can be configured to manage at least one of a deployment, automation, and management software application, a data center management server software application, or a third-party cloud management platform application. The software and platforms can serve to manage various network endpoints, and the management can be performed in a data-driven manner. In some examples, cloud computing can include a approach to computing that builds on virtualization's efficient pooling of resources to create an on-demand, elastic, self-managing virtual infrastructure that can be allocated dynamically as a service. The virtualization can enable cloud computing by uncoupling applications and information from the complexity of the underlying hardware infrastructure.

The method can further include determining that the orchestration node is non-operational and designating the first local control plane or the second local control plane to deploy the services previously deployed by the orchestration node. This replacement of an orchestration node with a local control plane can allow the network to function in a headless mode of operation.

In some examples, the VIMs can include a first VIM including a legacy version and an application programming interface ("API") type and a second VIM including a current version and a different API type. The local control planes can be configured to interface between the first VIM and the second VIM. The local control planes can provide an intermediary messaging protocol to interface between different VIMs having different versions. Accordingly, the local control planes can serve as a reconciliation and abstraction layer.

These stages can be performed by a system in some examples. Alternatively, a non-transitory, computer-readable medium including instructions can cause a processor to perform the stages when the processor executes the instructions.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

While the present disclosure includes examples using VMWARE-based implementations, it is to be understood that embodiments of the present disclosure can be used in connection with any suitable virtualized network implementation.

The disclosed systems and methods are generally directed to managing virtual infrastructure resources in cloud environments. One example of virtualization can include creating a virtual (rather than physical) version of computer hardware platforms, storage devices, and computer network resources.

Various embodiments describe a virtual network hierarchy including local control planes that communicate with and are proximate to VIMs and respective endpoints. A local control plane can include a part of the network architecture that can control network topology and can define what to do with incoming packets. In some examples, the local control plane can participate in routing protocols. The routing protocols can have routing tables that include a list of destination addresses and associated outgoing interfaces. Local control plane logic also can define certain packets to be discarded, as well as preferential treatment of certain packets to enable differentiated services.

The hierarchy also includes orchestration nodes that manage the local control planes and entitlement servers that sit above the orchestration nodes on the network. An example of an entitlement server can include a centralized network software system which provides access tokens, or keys, to client components in order to enable licensed services and software to run on them. The entitlement server can determine and control the activation and functionality of the client components based on the license entitlements that are defined, for example, by an organization.

The entitlement servers can authenticate various services and endpoints associated with the local control planes through the orchestration nodes. In some examples, the disclosed systems can use the local control planes, orchestration nodes, and entitlement servers and their corresponding architectural connections to orchestrate VNF and network services, for example, for enterprise deployments that span various geographically separate regions. In other examples, the disclosed systems can leverage local control planes to enable multicloud services. The disclosed systems can extend local control plane deployments to provide NFV by using the orchestration nodes as VNFMs on the network.

One example of multicloud can include multiple cloud computing and storage services that can be used in a single heterogeneous architecture. This also refers to the distribution of cloud assets, software, applications, etc. across several cloud-hosting environments. With a typical multicloud architecture using two or more public clouds as well as multiple private clouds, a multicloud environment can reduce the reliance on any single cloud provider. Multicloud can differ from hybrid cloud in that it refers to multiple cloud services rather than multiple deployment modes (for example, public, private, legacy modes).

In some applications (for example, telecommunications applications), the disclosed systems can deploy local control planes to provide services across regions using multiple orchestration nodes. The orchestration nodes can manage local control planes in the local control planes' respective region. Each local control plane can serve as a manager of various network endpoints. Such endpoints can serve as various network functions including, but not limited to, resource provisioning and allocation, performance monitoring, workflow automation and user privilege management, virtual data center functions, and the like. In some examples, provisioning can include an enterprise-wide configuration, deployment and management of multiple types of network resources. Provisioning can be applied to monitor user and customer access rights and privacy while ensuring enterprise resource security. Network access provisioning can include multiple client system configuration steps that vary according to connection technology and involve device configuration, driver installation, and the like. Server provisioning can include the preparation of a server for network operation via the installation and connection of data, software, and systems.

In some examples, the orchestration nodes can transfer and validate activation keys with an entitlement server. The entitlement server can serve to activate the orchestration nodes and the local control planes, and various endpoints and appliances associated with the local control planes. In an example, an appliance can include a typically inexpensive computing device, sometimes called a thin client, that enables network access and some business-related activities but may lack certain features of a fully equipped computer. Applications used on network appliances typically are housed on a server accessed by the appliance. Network appliances can be used to ease remote management and cut costs.

The entitlement server can perform various services (for example, billing and usage monitoring, resource provisioning, and the like) for the orchestration nodes. The orchestration nodes can, in turn, manage the collection of the local control planes.

The disclosed systems can be applied in a telecommunications deployment including fault domains. The deployment can be spread geographically, for example, having a portion that is deployed on the east coast of the United States and a portion that is deployed on the west coast of the United States. Accordingly, each geographical region can have an associated fault domain. The deployment can include a multitude of VIMs at each region, and each VIM can have an associated local control plane, that is aggregated at the regional level. The orchestration nodes can be deployed in each region to manage local nodes such as local control planes and associated VIMs. In one example, the regions correspond to multiple clouds.

The disclosed systems can provide scalability for virtual networks. For example, the disclosed systems can manage local control plane deployments across global regions, which can otherwise be challenging for a single component such as a single entitlement server.

The disclosed systems can enable a headless mode of virtual network operation. For example, in some cases, a given local control plane can be elevated to having the same or similar capabilities as an orchestration node. If a given orchestration node becomes non-operational, an existing local control plane can be elected to resume orchestration node capabilities and manage respective VIMs and endpoints.

The disclosed systems can enable multicloud orchestration and management. For example, an orchestration node can orchestrate multicloud deployments of network services by leveraging multi-site workflows that are supported by the local control planes. The disclosed systems can thereby enable multi-tenancy and role-based access control (RBAC) controls for network services, VNFs, VIMs, and the like. RBAC can refer to an approach to restricting system access to authorized users and can be a policy neutral access control mechanism defined around roles and privileges. In some examples, the disclosed systems can implement multi-layer diagnostics in the NFVI to identify errors within the virtual network. The disclosed systems can provide the ability to integrate multiple versions of NFVI clouds by providing local control plane support for multiple external application programming interfaces ("APIs"). In some examples, an API can include a set of subroutine definitions, communication protocols, and tools for building software. In general terms, an API can refer to a set of clearly defined methods of communication among various components.

In some examples, the disclosed systems can enable automatic bootstrapping of NFV VIMs. The disclosed systems can provide no-touch provisioning of remote system endpoints that can simplify the management and registration of endpoints such as VIMs, VNFs, and network services. Conventional systems can require bi-directional manual registration. The disclosed systems can create bi-directional trust without the requirement for explicit bi-directional registration. The disclosed systems can generate bi-directional trust for data center management infrastructure. In some examples, the disclosed systems can perform health validation of links via periodic heartbeat checks of the local control planes and corresponding endpoints, and any orchestration nodes. The disclosed systems can delegate version compatibility assurance for VIMs and endpoints to the local control planes.

Figure 1:
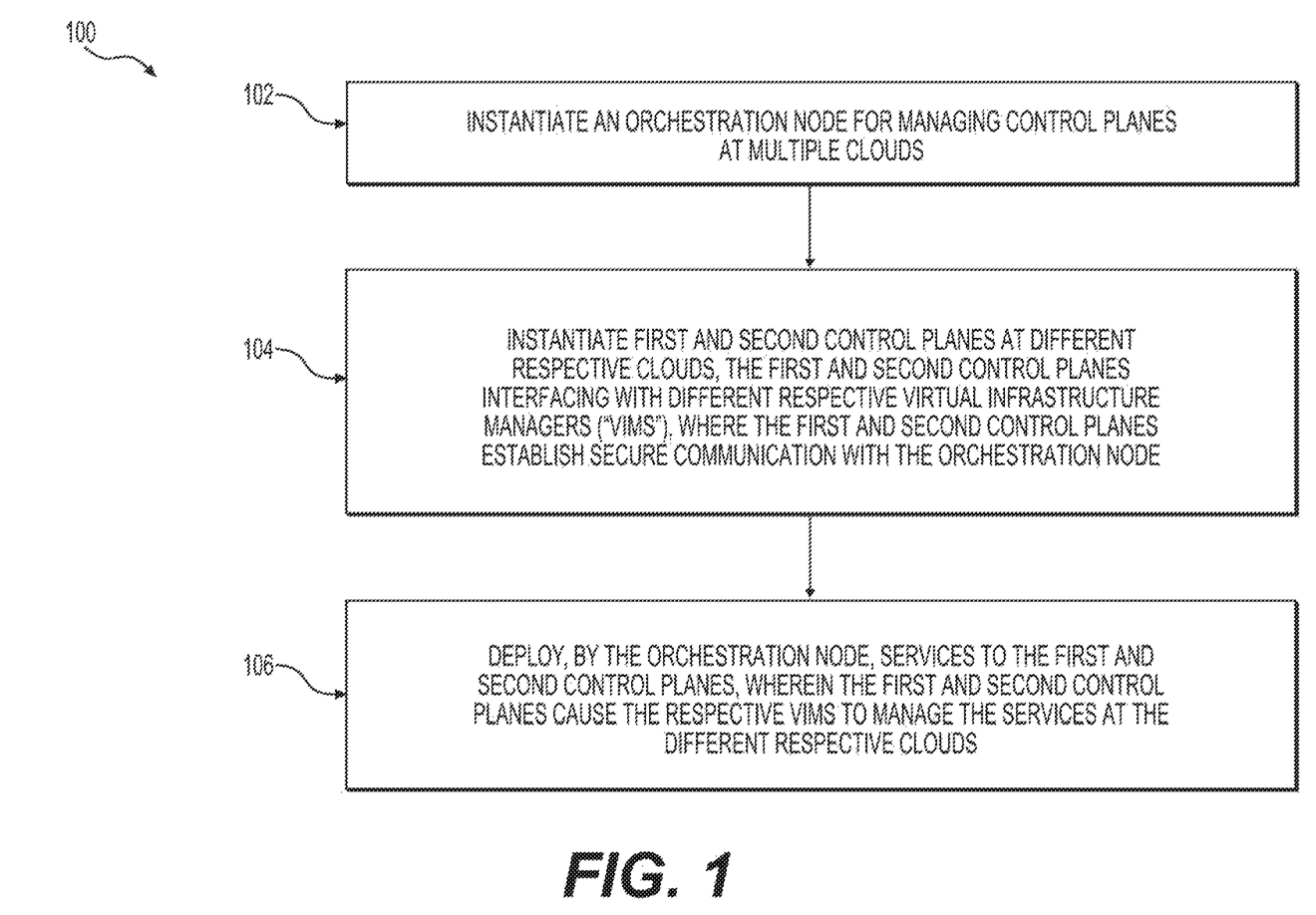
FIG. 1 shows an example flowchart for managing virtual infrastructure resources in cloud environments.

FIG. 1 shows an example flowchart 100 for managing virtual infrastructure resources in cloud environments. In some examples, virtual infrastructure resources can communicate with physical resources (server, storage, and the like), and can include virtual resources (for example, virtual machines ("VMs")) and software resources (for example, hypervisors) in an NFV environment. A VM can include a software simulation of a hardware platform that provides a virtual operating environment for guest operating systems. A VM can have its own operating system image, which can be independent from that of the host operating system or can be based on other VMs running on the same host. VMs can serve to improve the overall physical hardware utilization of a network. A virtualization layer, or hypervisor, can run the VMs and can abstract the hardware from the VM. This can allow for mobility and portability of VMs across hardware platforms. As used herein, a "hypervisor" can refer to a software program that runs on an actual host hardware platform and supervises the execution of the guest operating systems on the VMs.

At stage 102, the disclosed systems can instantiate an orchestration node for managing local control planes at multiple clouds. The orchestration node can manage the life cycle of local control planes. For example, the orchestration node can create, maintain, and terminate VNF instances, which can be installed on the VMs. A corresponding VIM can create and manage these VMs. The orchestration node can provide for the fault, configuration, accounting, performance and security ("FCAPS") management associated with the local control planes. Moreover, the orchestration node can scale up or scale down the VNFs which can result in scaling up and scaling down of corresponding resource usage (for example, the number of VMs or processor usage).

In some examples an orchestration node can serve to manage and coordinate the resources from different VIMs, when there are multiple VIMs in same or different network locations. For example, different tenants can be allocated different VIMs to keep data securely separate from one another. Tenants can be customers of the network provider, each leasing a portion or slice of the network. First and second VIMs can correspond to different tenants for purposes of keeping tenant data separate from one another.

The orchestration node can perform resource orchestration whereby the orchestration node coordinates, authorizes, releases, and engages virtual infrastructure resources among different points of presence ("PoPs") or within one PoP. A PoP can refer to an artificial demarcation point or interface point between communicating entities. The orchestration node can perform the resource orchestration by engaging with the VIMs directly through their APIs.

At stage 104, the disclosed systems can instantiate first and second local control planes at different respective clouds, the first and second local control planes interfacing with different respective VIMs, where the first and second local control planes establish secure communication with the orchestration node. This stage can thereby enable multicloud deployments of network resources. The local control planes can manage, using the VIMs, the life cycle of virtual resources in an given domain such as a cloud. In particular, the local control planes can use the VIMs to create, maintain, and tear down VMs from underlying physical resources. The local control planes can use the VIMs to keep inventory of VMs associated with physical resources. The VIMs can manage the performance and faults associated with hardware, software, and virtual resources. In some examples, the local control planes can use the VIMs to maintain APIs and expose physical and virtual resources to other management systems. The established secure communications can incorporate encryption, where data is encrypted and protected against external attackers.

In some examples, the VIMs can include a first VIM comprising a legacy version and an API type and a second VIM comprising a current version and a different API type. Further, the local control planes are configured to interface between the first VIM and the second VIM. For example, the local control planes can abstract the functionality of the VIMs and can communicate via the different APIs using an intermediary messaging protocol. In other examples, the local control planes can be configured to manage at least one of a deployment, automation, and management software application, a data center management server software application, or a third-party cloud management platform application, as discussed further in connection with FIG. 3, below. The management can be performed in a data-driven manner.

At stage 106, the disclosed systems can deploy, by the orchestration node, services to the first and second local control planes, where the first and second local control planes cause the respective VIMs to manage the services at the different respective clouds. The orchestration node can perform service orchestration to create the end-to-end service among different local control planes and associated VIMs on different clouds. The orchestration node can perform service orchestration by coordinating with the respective local control planes. With this arrangement, the orchestration node does not need to talk to the VNFs directly. For example, the orchestration node can create a service between the VNFs of one vendor and the VNFs of another vendor. The orchestration node can perform service orchestration to instantiate the local control planes, where applicable. The orchestration node can perform topology management of network services instances. The orchestration node can serve to bind together different functions of the local control plane and can create an end-to-end service in addition to performing resource coordination in an otherwise dispersed NFV environment.

In some examples, a NFV can include a virtualization implementation running software-defined network functions, independent of specific hardware platforms. NFV can also refer to a formal network virtualization initiative led by various telecommunications network operators. Further, VNFs can include virtualized tasks formerly carried out by dedicated hardware. In contrast to an NFV, a VNF can refer to the building block of the tasks within an European Telecommunications Standards Institute ("ETSI") NFV framework. VNFs can move individual network functions out of dedicated hardware devices into software that runs on commodity hardware. These tasks can be used by both network service providers and businesses. The tasks can include, but are not limited to, firewalls, domain name system, caching or network address translation and can run as VMs. A NFV, on the other hand, can refer to the implementation of a network function using software that is decoupled from the underlying hardware. In some examples, an NFV management and network orchestration ("NFV MANO") can refer to a framework developed by a working group of the same name within the ETSI framework for NFV. The NFV MANO can include the ETSI-defined framework for the management and orchestration of all resources in a virtualized data center including compute, networking, storage, and VM resources.

Further, a NFVO can include a component of the NFV MANO architectural framework, which helps standardize the functions of virtual networking to increase interoperability of software-defined networking ("SDN") elements. The NFVO can perform resource orchestration and network service orchestration, as well as other functions.

In some cases, a VNF manager ("VNFM") can include a component of the NFV MANO architectural framework, that allows for interoperability of software-defined networking elements that use network function virtualization. The VNFM can be responsible for the lifecycle management of VNFs. VNFM operations can include: the instantiation of VNFs, the scaling of VNFs, the updating and/or upgrading VNFs, and the termination of VNFs. In some cases, the VNF instances can have an associated VNF manager. A VNFM can be assigned to either a single VNF instance or multiple instances. The managed VNFs can be of the same or different types. VNFMs can be applied to a variety of different VNFs because they are typically generic.

In some examples, a NFV infrastructure ("NFVI") can include a component of the NFV architecture that describes the hardware and software components on which virtual networks are built. NFVI can be made of NFV infrastructure points-of-presence ("NFVI-PoPs") which are where the VNFs, including resources for computation, storage, and networking, are deployed by a network operator. NFVI networks can interconnect the computing and storage resources contained in an NFVI-PoP. This can include specific switching and routing devices to allow external connectivity.

In some examples, an entitlement server can authorize the orchestration node to deploy the services. The disclosed systems can receive, by the orchestration node, a resource request from the first local control plane. The disclosed systems can then deploy resources from an additional local control plane of the local control planes to the first local control plane. In other examples, the entitlement server can authorize different services for a second orchestration node. The second orchestration node can deploy the different services to a third local control plane.

The deployment of the services to the first local control plane can include receiving, at the orchestration node, an activation key from the first local control plane. The authorization by the entitlement server can include verifying the activation key. In some examples, the disclosed systems can further determine that the orchestration node is non-operational. Accordingly, the disclosed systems can designate the first local control plane or the second local control plane to deploy the services previously deployed by the orchestration node.

Figure 2:
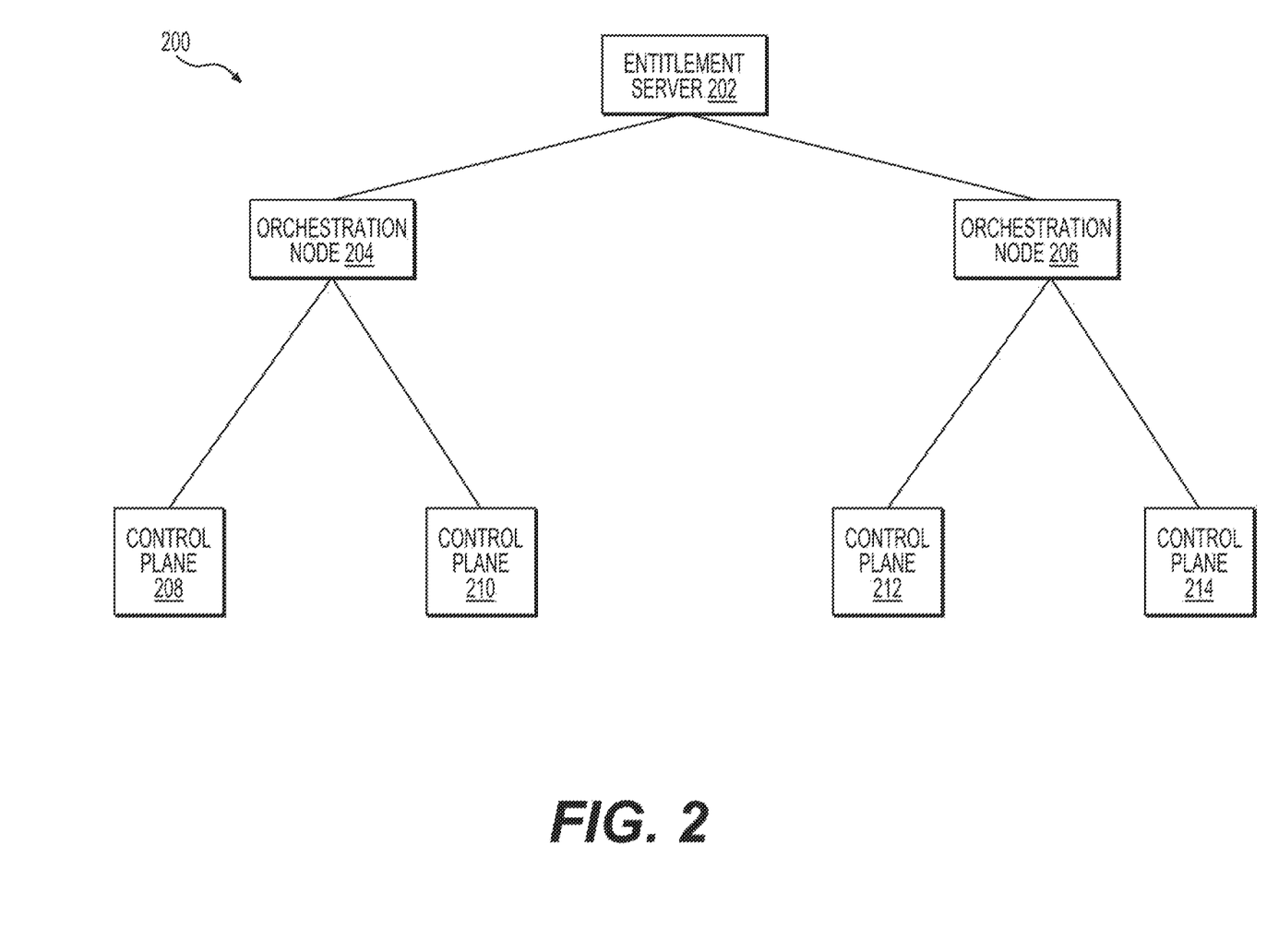
FIG. 2 shows a system diagram of a hierarchy including an entitlement server, orchestration nodes, and local control planes.

FIG. 2 shows a system diagram of a hierarchy including an entitlement server, orchestration nodes, and local control planes. System 200 includes an entitlement server 202 that can communicate with orchestration node 204 and orchestration node 206. Orchestration node 204 can be connected to local control plane 208 and local control plane 210. Orchestration node 206 can be connected to local control plane 212 and local control plane 214.

The local control planes 208, 210, 212, and 214 can include system nodes (not shown), in an example. The system nodes can include a software tool that can abstract on-premises private and public cloud resources and can present them to the applications as an end-to-end entity. The software tool can provide secure and optimized multi-site connectivity to achieve cloud infrastructure hybridity.

The local control plane 210 can manage NFVI deployments. Non-limiting examples of such deployments can include software that facilitates running enterprise-grade OpenStack clouds on top of virtualization infrastructure, server management software that provides a centralized platform for controlling virtualized networking environments and automating and delivering virtual infrastructure across hybrid clouds, third party cloud management platforms, and the like.

In some examples, the orchestration nodes 204 and 206 can include NFVMs. Further, the orchestration nodes 204 and 206 can manage the local control planes 208 and 210 and local control planes 212 and 214, respectively, from a higher position in the network.

The entitlement server 202 can manage multiple orchestration nodes, such as orchestration node 204 and orchestration node 206. The local control planes 208, 210, 212, and 214 can register with their respective orchestration nodes 204 and 206. The orchestration nodes 204 and 206 can establish secure communication channels for sending and receiving messages to and from the local control planes 208, 210, 212, and 214. The orchestration nodes 204 and 206 can orchestrate multi-cloud deployments of network services via the local control planes 208, 210, 212, and 214. The orchestration nodes 204 and 206 can have a multi-cloud visibility into the NFVI depicted by diagram 200 by using the local control planes 208, 210, 212, and 214. The orchestration nodes 204 and 206 can perform management functions like NFVI patching and upgrade using rolling upgrades without detrimentally impacting services offered by the NFVI.

Figure 3:
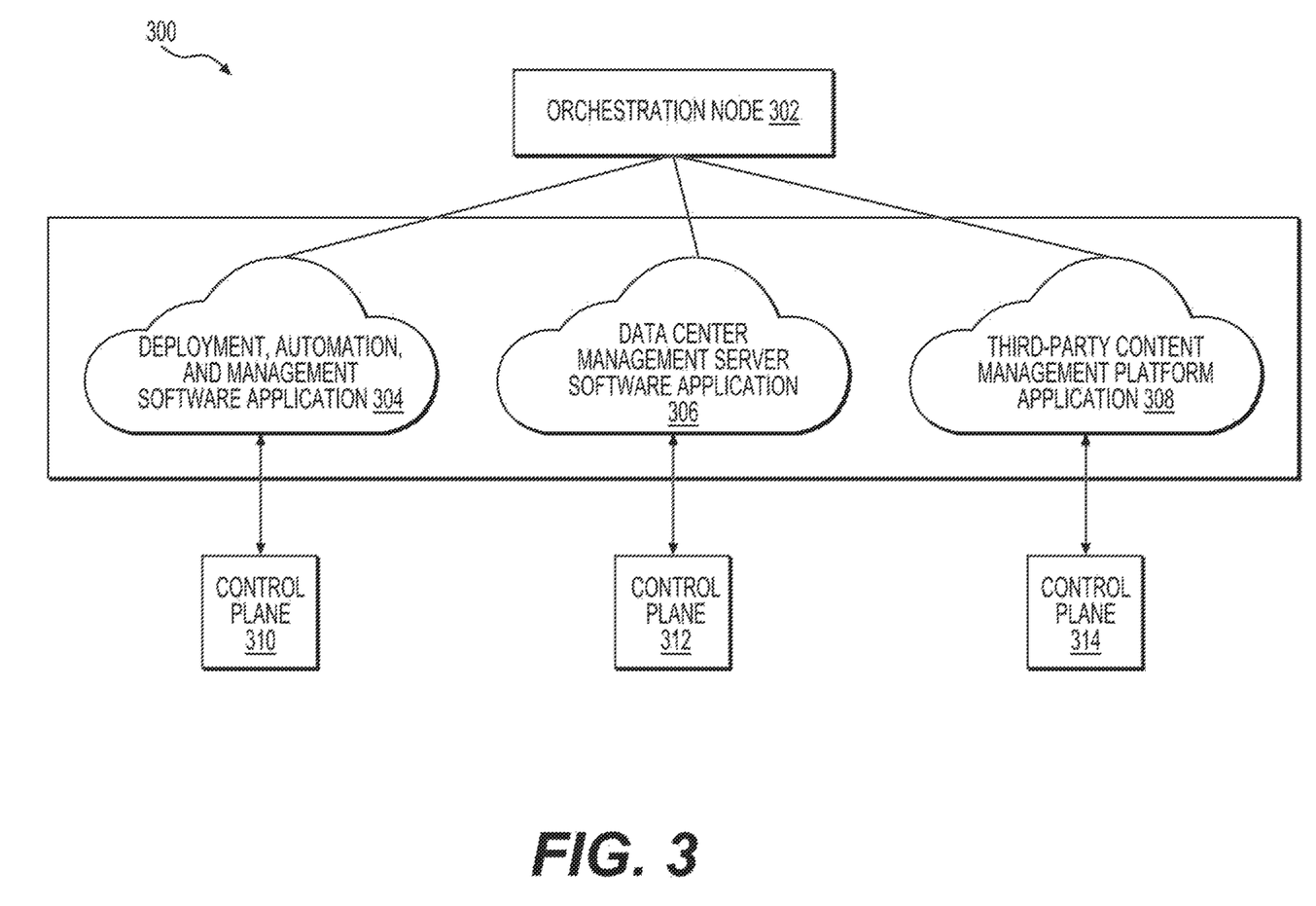
FIG. 3 shows a system diagram of a hierarchy including an orchestration node connected to cloud-based software applications for communicating with local control planes.

FIG. 3 a system diagram of a hierarchy including an orchestration node connected to cloud-based software applications for communicating with local control planes. System 300 includes an orchestration node 302 that can be connected to a deployment, automation, and management software application 304, a data center management server software application 306, and third-party cloud management platform application 308. The deployment, automation, and management software application 304 can be connected to local control plane 310. The data center management server software application 306 can be connected to local control plane 312. Further, the third-party cloud management platform application 308 can be connected to local control plane 314.

In some examples, the deployment, automation, and management software application 304 can include an integrated software stack that can use software-defined data center ("SDDC") as an automated lifecycle management tool. The SDDC can refer to extension of virtualization to include abstraction, pooling, and automation to data center resources and services to achieve IT as a service ("ITaaS"). The deployment, automation, and management software application 304 can bundle compute, storage and network virtualization into a single platform that can deployed on premises as a private cloud or run as a service within a public cloud. The deployment, automation, and management software application 304 can reduce the administrative silos in data centers, merging compute, storage and network provisioning to facilitate end-to-end support for application deployment.

In some examples, the deployment, automation, and management software application 304 can include a VMWARE integrated OpenStack ("VIO") software tool. The VIO can refer to an OpenStack distribution for companies that want to deploy and manage a private cloud on top of virtual network infrastructure. VIO can simplify the deployment of an OpenStack cloud by providing OpenStack APIs to access the virtualized infrastructure.

In other examples, the data center management server software application 306 can enable cloud service providers to convert physical data centers into elastic virtual data centers ("VDCs"). The data center management server software application 306 can provide such VDCs by converting physical data center resources, such as network, storage and compute, into VDC resources, which a service provider can then make available as catalog-based services to internal users through a web portal. The VCDs can include policy controls to apply pre-determined limits on users to regulate the consumption of resources and restrict access. In some examples, the data center management server software application 306 can include a generic VNF life-cycle management capability integrated with the SDDC stack and third-party element managers.

In some examples, the third-party cloud management platform application 308 can include a software tool for the management of public, private and hybrid cloud environments. The cloud management platform application 308 can incorporate self-service interfaces, provision system images, enable metering and billing, and provide for some degree of workload optimization through established policies.

In some examples, the local control planes (for example, local control planes 310, 312, and 314) can sit adjacent to VIMs (not shown). Accordingly, the local control planes can provide multi-VIM support, including activating and aggregating the VIMs. Additionally, the local control planes can provide compatibility between different version of the VIMs, thereby serving as a reconciliation and abstraction layer. This compatibility can be provided because the local control plane can insulate and abstract the VIMs, converting requests to the control plane into actionable requests at the VIMs. The local control planes can thereby integrate with different endpoint types. For example, one endpoint can include an first vendor-specific implementation (for example, an OpenStack implementation), another endpoint can include a second vendor-specific implementation (for example, a vSphere by VMWARE implementation), and a third endpoint can include a centralized management application implementation (for example, a vCenter by VMWARE implementation), each of which can be abstracted by the respective local control planes to facilitate interoperability.

In some examples, the services and information associated with the endpoints can be aggregated at the local control planes. Further, the services and information associated with the local control planes can being aggregated at the orchestration node. For example, a given endpoint can be running a version of software that is current, while a different endpoint can be running an older version of software. However, since the endpoints are being abstracted by the local control planes, the local control planes and the orchestration node can facilitate the exchange of services and information between the endpoints having different versions of software. Accordingly, the local control planes can serve as a reconciliation and abstraction layer.

Figure 4A:
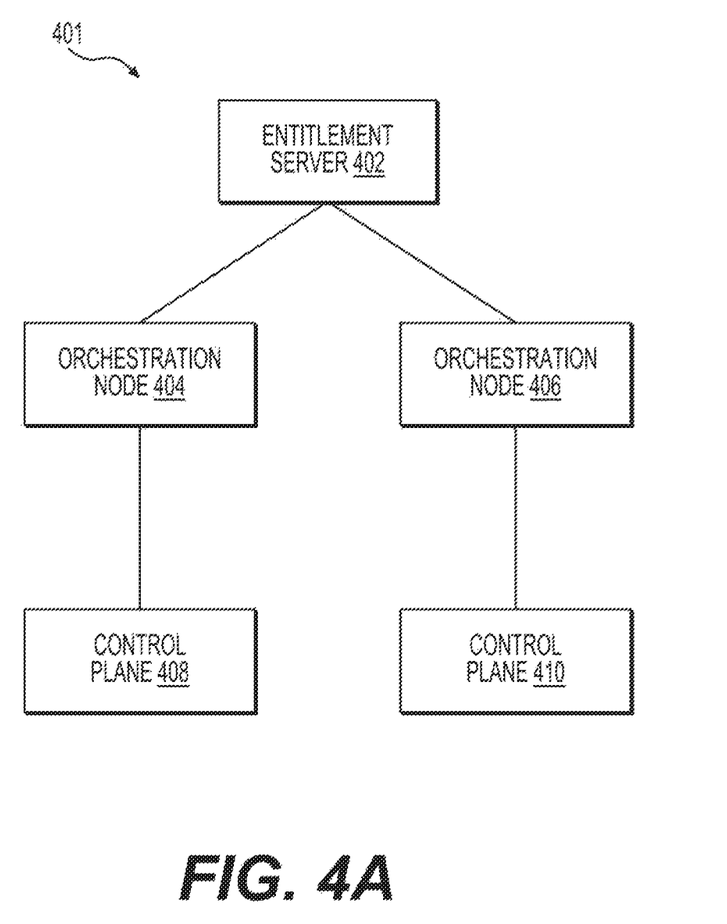
FIGS. 4A-4C show system diagrams of different system hierarchies including an entitlement server, orchestration nodes, regional proxies, network virtualization functions ("NVFs"), and local control planes.
Figure 4B:
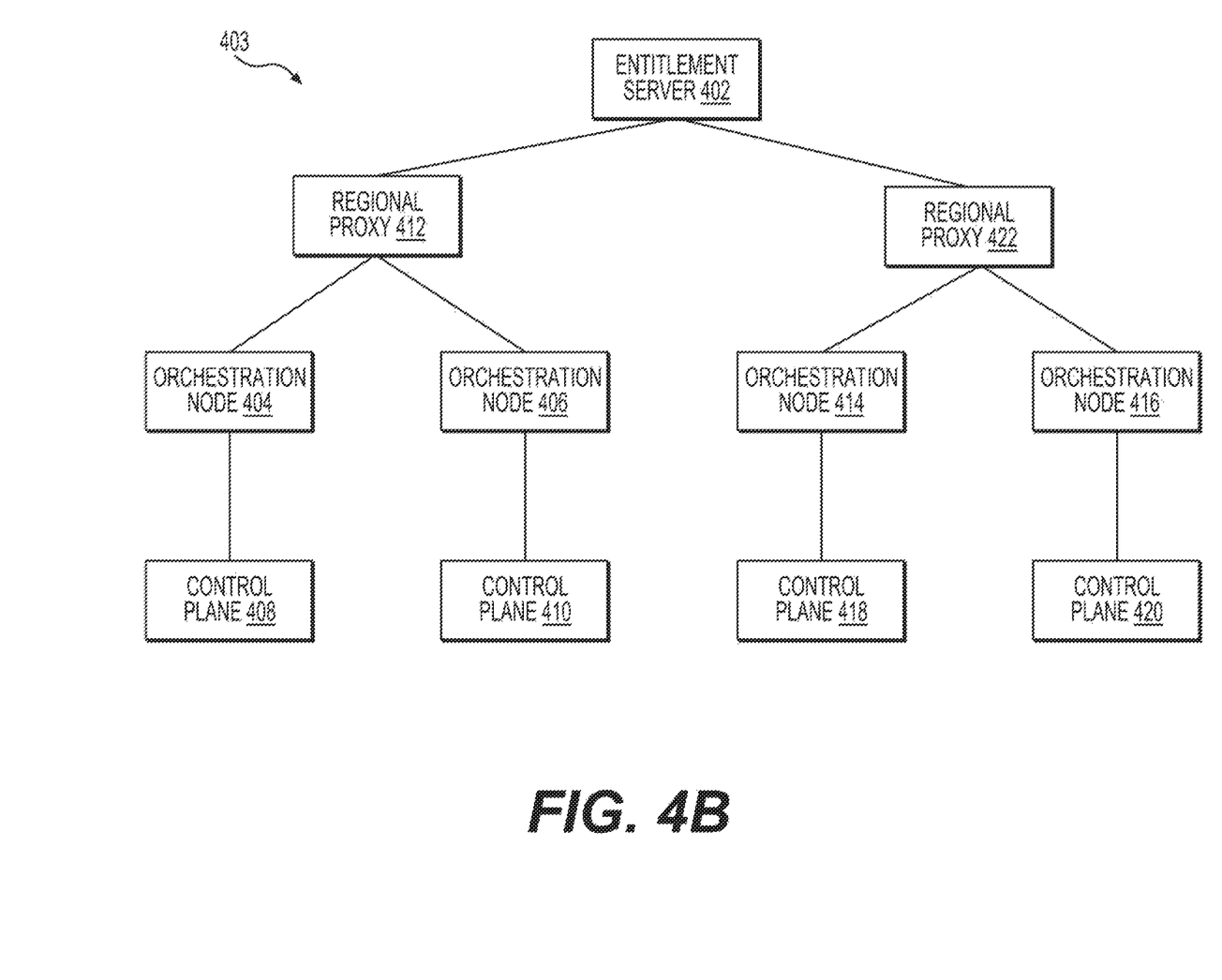
Figure 4C:
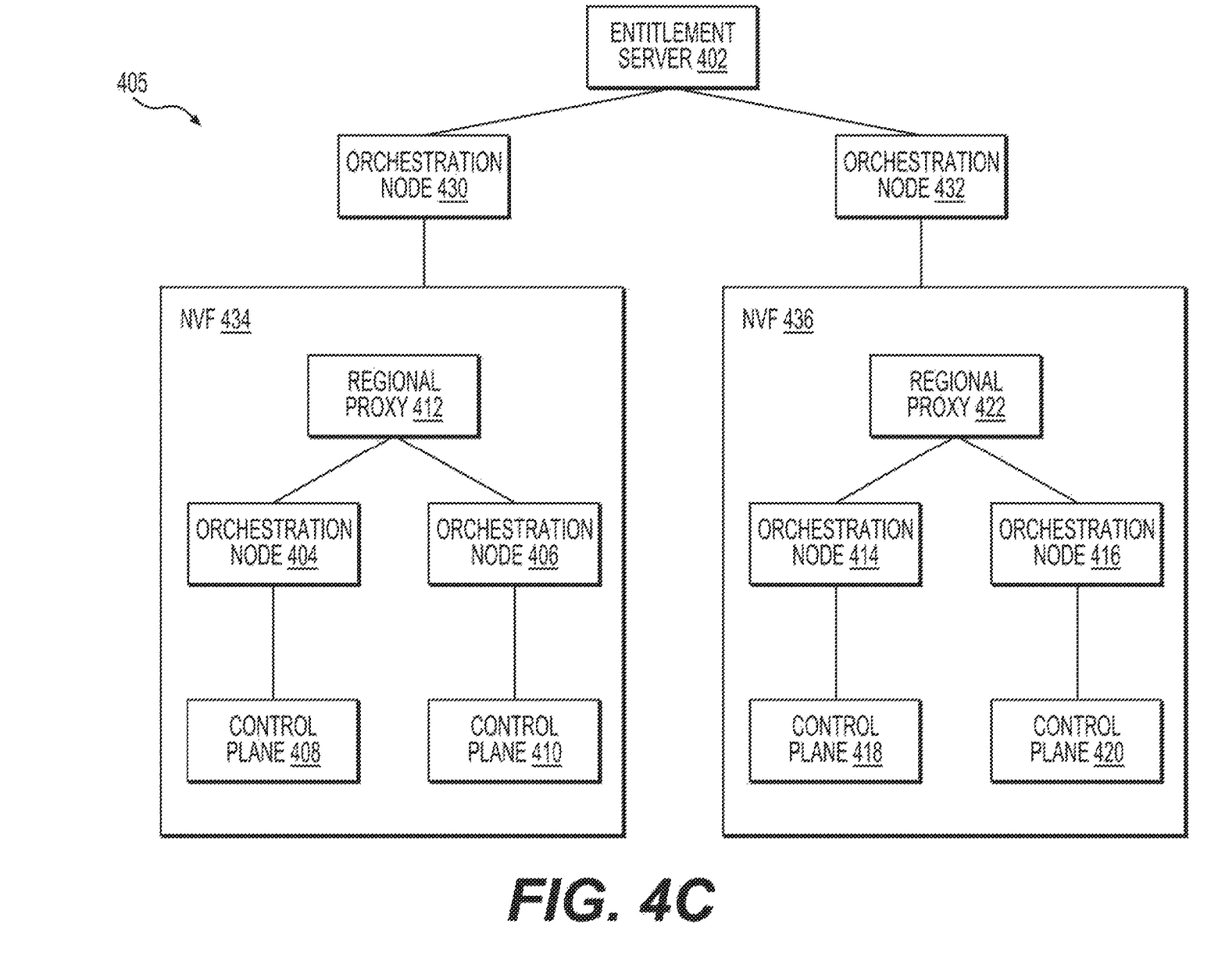

FIGS. 4A-4C show system diagrams of different system hierarchies including an entitlement server, orchestration nodes, regional proxies, NVFs, and local control planes. Hierarchy 401 includes entitlement server 402, which can be connected to orchestration node 404 and orchestration node 406. Orchestration node 404 can be connected to local control plane 408. Orchestration node 406 can be connected to local control plane 410. The entitlement server 402 and orchestration nodes 404 and 406 are similar to the descriptions provided in connection with the preceding figures.

Hierarchy 403 includes entitlement server 402, which can be connected to regional proxy 412 and regional proxy 422. Regional proxy 412 can be connected to orchestration node 404 and orchestration node 406. The regional proxies 412 and 422 can include proxy servers, which can refer to a server that acts as an intermediary for requests from clients seeking resources from other servers. Clients such as orchestration nodes 404 or 406 can connect to the proxy server, requesting some service, such as a file, connection, web page, or other resource available from a different server. The proxy server can evaluate the request to simplify and control the flow of information and services on the network.

Orchestration node 404 can be connected to local control plane 408. Orchestration node 406 can be connected to local control plane 410. Similarly, regional proxy 422 can be connected to orchestration node 414 and orchestration node 416. Orchestration node 414 can be connected to local control plane 418. Orchestration node 416 can be connected to local control plane 420.

Hierarchy 405 includes entitlement server 402, which can be connected to orchestration node 430 and orchestration node 432. In contrast to diagram 403, the orchestration nodes 430 and 432 can be associated with different NVFs 434 and 436, which can perform different operations on the network. That is, orchestration node 430 can be connected to NVF 434. Orchestration node 432 can be connected to NVF 436. The NVFs can move individual network functions out of dedicated hardware devices into software that runs on commodity hardware. These tasks can be used by both network service providers and businesses, and can include firewalls, domain name system ("DNS"), caching or network address translation ("NAT") and can run as VMs. Further, the NVFs can be in different geographical locations, such as different clouds.

In some examples, NVF 434 can include a regional proxy 412 and associated orchestration nodes and local control planes. NVF 436 can include a regional proxy 422 and associated orchestration nodes and local control planes. Regional proxy 412 can be connected to orchestration node 404 and orchestration node 406. Orchestration node 404 can be connected to local control plane 408. Orchestration node 406 can be connected to local control plane 410. Similarly, regional proxy 422 can be connected to orchestration node 414 and orchestration node 416. Orchestration node 414 can be connected to local control plane 418. Orchestration node 416 can be connected to local control plane 420.

Figure 5:
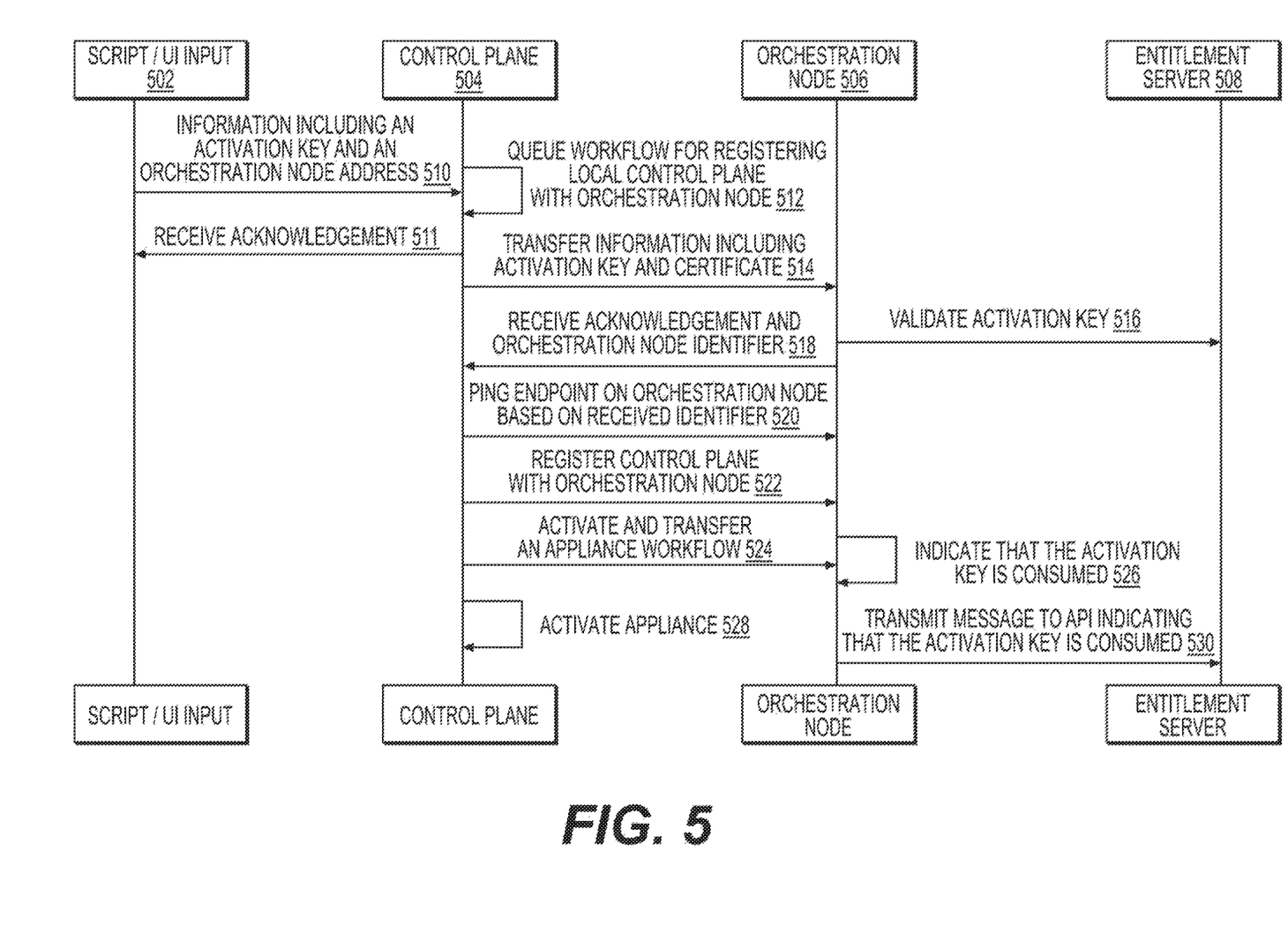
FIG. 5 is a sequence diagram including example system operations for registering a local control plane with an orchestrator and an entitlement server.

FIG. 5 is a sequence diagram including example system operations for registering a local control plane with an orchestrator and an entitlement server. As shown in FIG. 5, the stages can take place between a script and user interface ("UI") input module 502, local control plane 504, orchestration node 506, and an entitlement server 508. At stage 510, the script and UI input module 502 can transmit information including an activation key and an orchestration node address to the local control plane 504. At stage 511, the script and UI input module 502 can receive an acknowledgment message from the local control plane 504. In some examples, a user can manually input the information to the UI of the script and UI input module 502. In other examples, the disclosed systems can configure automated scripts to input the information to the script and UI input module 502. In some examples, the disclosed systems can use different activation keys for a local control plane 504 deployed in different environments, for example, a cloud-environment versus an on-premise environment. By using the activation keys, the disclosed systems can track the activity of orchestration node 506 and can impose restrictions on the operations of the local control plane 504 and the orchestration node 506.

The activation key can include a series of numbers and letters and can be passed to a verification function in the entitlement server 508, as described below. The activation key can be generated using any suitable algorithm, including a cryptographic hash function. Such a function can represent a mathematical algorithm that maps data (for example, the orchestration node address) of arbitrary size to a bit string of a fixed size (a hash) and is designed to be a one-way function, that is, a function which is infeasible to invert.

At stage 512, the local control plane 504 can queue a workflow for registering the local control plane 504 with the orchestration node 506. In some examples, the disclosed systems can queue the workflow based on relative priorities associated with various services that the workflow can instantiate. For example, a workflow for registering a local control plane 504 providing security critical microservices can be prioritized in the queue so that such a local control plane 504 is registered quickly. Microservices can include a software development technique that structures an application as a collection of loosely coupled computer-implementable services. In a microservices architecture, services can be fine-grained, and the protocols can be lightweight.

In some examples, the orchestration node 506 can register specific tenants for a given NFV service. For example, a network provider can contract with multiple tenants to provide network slices to those tenants. The slices can perform tasks specified by tenants and require performance minimums defined in service level agreements ("SLAs"). A slice can utilize multiple VNFs in a slice path. The orchestration node 506 can register and deploy these VNFs, in an example.

At stage 514, the local control plane 504 can transfer information including the activation key and a certificate to the orchestration node 506. In some examples, the certificate can serve as proof that the activation key was obtained in a legal and authorized manner. In some cases, the disclosed systems can store the certificate on a database or storage device as reference. In some cases, the disclosed systems can transfer the information in an encrypted format, such that eavesdroppers are unable to determine the activation key or replicate the certificate.

At stage 516, orchestration node 506 can validate the activation key based on communications with an entitlement server 508. The entitlement server 508 can verify the activation key by inputting the activation key to a function. The function can manipulate the activation key's sequence according to a mathematical algorithm and can attempt to match the results to a set of valid solutions. In some examples, the entitlement server 508 can perform a checksum operation on the activation key and communicate the results to the orchestration node 506. In other examples, the entitlement server 508 can perform a search of a database to determine whether the activation key is valid and can communicate the results to the orchestration node 506.

At stage 518, the local control plane 504 can receive an acknowledgment from the orchestration node 506 in addition to an orchestration node identifier. In some examples, the acknowledgment can serve to indicate that the activation key was validated by the entitlement server 508. Accordingly, the disclosed systems can use the orchestration node identifier to register the local control plane 504 with the appropriate orchestration node 506.

At stage 520, the local control plane 504 can ping an endpoint based on the received identifier. In some examples, the local control plane 504 can thereby determine that the endpoints are operational and available for registration. In other examples, the local control plane 504 can perform the pinging by transmitting messages to the APIs associated with the endpoints.

At stage 522, the local control plane 504 can register itself with the orchestration node 506. As part of that registration, the disclosed systems can set up a secure communication channel for sending and receiving messages between local control plane 504 and the orchestration node 506, and between the entitlement server 508 and the orchestration node 506. Accordingly, the orchestration node 506 can receive messages from various appliances and network endpoints via the local control plane 504 and perform services such as publishing bills, upgrades, and the like.

At stage 524, the local control plane 504 can activate and transfer an appliance workflow to the orchestration node 506. In some examples, the appliance workflow can include various tasks that are to be performed for the appliance using network resources. Accordingly, the orchestration node 506 can prioritize the workflow and recruit resources (for example, compute and storage resources) on the network in order to perform the workflow.

At stage 526, the orchestration node 506 can indicate that the activation key is consumed. Accordingly, the activation key may not be reusable by other appliances, endpoints, and local control planes in a duplicative manner. This can allow for added control and security for the network. Further, the orchestration node 506 can, in combination with the entitlement server 508, determine that the workflow corresponds to a given VM. In particular, different tenants may deploy different VMs having different workflows, and the disclosed systems can ascertain the correspondence between the VMs and the workflows. In some examples, the entitlement server 508 can authorize the orchestration node 506 to deploy services in accordance with the workflows. Accordingly, the orchestration node 506 can receive a resource request from the local control plane 504, and the disclosed systems can deploy resources from an additional local control plane to the local control plane 504.

At stage 528, the local control plane 504 can activate an appliance. Accordingly, the appliance can be integrated into the network and can therefore use various resources of the network to perform suitable tasks. For example, the appliance can recruit processing resources on a given cluster associated with the network to perform calculations as part of a workflow.

At stage 530, the orchestration node 506 can transmit a message to the API of the entitlement server 508 indicating that the activation key is consumed. Accordingly, the entitlement server 508 can be made aware that activation key should not be reusable by other appliances, endpoints, and local control planes in a duplicative manner.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method, comprising:
   receiving, at a local control plane instantiated at a cloud, an activation key and an address associated with an orchestration node;
   transmitting, from the local control plane to the orchestration node using the address, the activation key;
   receiving, at the local control plane from the orchestration node, an indication that the activation key was validated by an entitlement server;
   receiving, at the local control plane from the orchestration node, an orchestration node identifier;
   registering the local control plane with the orchestration node using the received identifier; and
   activating an appliance at the local control plane, wherein the appliance requests resources from the orchestration node.

2. The method of claim 1, further comprising receiving resources at the local control plane from a different local control plane.

3. The method of claim 1, wherein the orchestration node consumes the activation key and informs the entitlement server that the activation key has been consumed.

4. The method of claim 1, wherein transmitting further comprises transmitting a certificate associated with the activation key.

5. The method of claim 1, wherein the activation key is initially received at the control plane from a user interface input module.

6. The method of claim 1, further comprising, prior to registering the local control plane with the orchestration node, pinging the orchestration node using the received identifier.

7. The method of claim 1, wherein activating the appliance comprises activating an appliance workflow that includes various tasks that are to be performed for the appliance using network resources.

8. A non-transitory, computer-readable medium containing instructions that, when executed by a hardware-based processor, cause the processor to perform stages comprising:
   receiving, from a user interface input module, an activation key and an address associated with an orchestration node;
   transmitting, from a local control plane instantiated at a cloud to the orchestration node using the address, the activation key;
   receiving, at the local control plane from the orchestration node, an indication that the activation key was validated by an entitlement server;
   receiving, at the local control plane from the orchestration node, an orchestration node identifier;
   registering the local control plane with the orchestration node using the received identifier; and
   activating an appliance at the local control plane, wherein the appliance requests resources from the orchestration node.

9. The non-transitory, computer-readable medium of claim 8, the stages further comprising receiving resources at the local control plane from a different local control plane.

10. The non-transitory, computer-readable medium of claim 8, wherein the orchestration node consumes the activation key and informs the entitlement server that the activation key has been consumed.

11. The non-transitory, computer-readable medium of claim 8, wherein transmitting further comprises transmitting a certificate associated with the activation key.

12. The non-transitory, computer-readable medium of claim 8, wherein the activation key is initially received at the control plane from a user interface input module.

13. The non-transitory, computer-readable medium of claim 8, the stages further comprising, prior to registering the local control plane with the orchestration node, pinging the orchestration node using the received identifier.

14. The non-transitory, computer-readable medium of claim 8, wherein activating the appliance comprises activating an appliance workflow that includes various tasks that are to be performed for the appliance using network resources.

15. A system, comprising:
- a memory storage including a non-transitory, computer-readable medium comprising instructions; and
- a computing device including a hardware-based processor that executes the instructions to carry out stages comprising:
  - receiving, at a local control plane instantiated at a cloud, an activation key and an address associated with the orchestration node;
  - transmitting, from the local control plane to an orchestration node using the address, the activation key;
  - receiving, at the local control plane from the orchestration node, an indication that the activation key was validated by an entitlement server;
  - receiving, at the local control plane from the orchestration node, an orchestration node identifier;
  - registering the local control plane with the orchestration node using the received identifier; and
  - activating an appliance workflow at the local control plane, wherein the appliance requests resources fron the orchestration node.

16. The system of claim 15, the stages further comprising receiving resources at the local control plane from a different local control plane.

17. The system of claim 15, wherein the orchestration node consumes the activating key and informs the entitlement server that the activation key has been consumed.

18. The system of claim 15, wherein transmitting further comprises transmitting a certificate associated with the activation key.

19. The system of claim 15, wherein the activation key is initially received at the control plane from a user interface input module.

20. The system of claim 15, the stages further comprising, prior to registering the local control plane with the orchestration node, pinging the archestration node using the received identifier.

* * * * *